United States Patent [19]

Beling et al.

[11] 4,272,712

[45] Jun. 9, 1981

[54] PHASE LOCKED LOOP CONTROL SYSTEM

[75] Inventors: Thomas E. Beling, Saxonville; Leopold Bric, Braintree, both of Mass.

[73] Assignee: Sigma Instruments, Inc., Braintree, Mass.

[21] Appl. No.: 28,702

[22] Filed: Apr. 10, 1979

[51] Int. Cl.³ ............................................. G05B 19/40
[52] U.S. Cl. .................................... 318/696; 318/561; 318/314; 318/318; 318/608
[58] Field of Search ............... 318/561, 685, 696, 314, 318/318, 608, 400

[56] References Cited

U.S. PATENT DOCUMENTS

| | | | |
|---|---|---|---|
| 3,569,808 | 3/1971 | Goto | 318/314 |
| 3,601,678 | 8/1971 | Abraham et al. | 318/696 |
| 3,609,488 | 9/1971 | Sampson et al. | 318/314 |
| 3,668,492 | 6/1972 | Konishi et al. | 318/314 |
| 3,818,261 | 6/1974 | Clarke, Jr. | 318/685 |
| 3,883,785 | 5/1975 | Fulcher et al. | 318/314 |

Primary Examiner—Gene Z. Rubinson
Assistant Examiner—Eugene S. Indyk
Attorney, Agent, or Firm—Toren, McGeady and Stanger

[57] ABSTRACT

In the disclosed system, if the frequency of input signals exceeds a value suitable for a load, the input signals and output signals are stored and compared in a comparator while locking of a phase locked loop is delayed by a loop filter that allows the output of the VCO (voltage controlled oscillator) to increase or decrease only at rates slower than given rates. When the input signals end after the loop locks, the filter delay causes the VCO to keep producing signals which are passed until the comparator recognizes that the number of output signals equals the number of input signals. If the input signals end before the loop locks, a logic circuit causes the VCO frequency to keep rising until another comparator indicates that the number of output signals has reached one-half the input signals.

7 Claims, 8 Drawing Figures

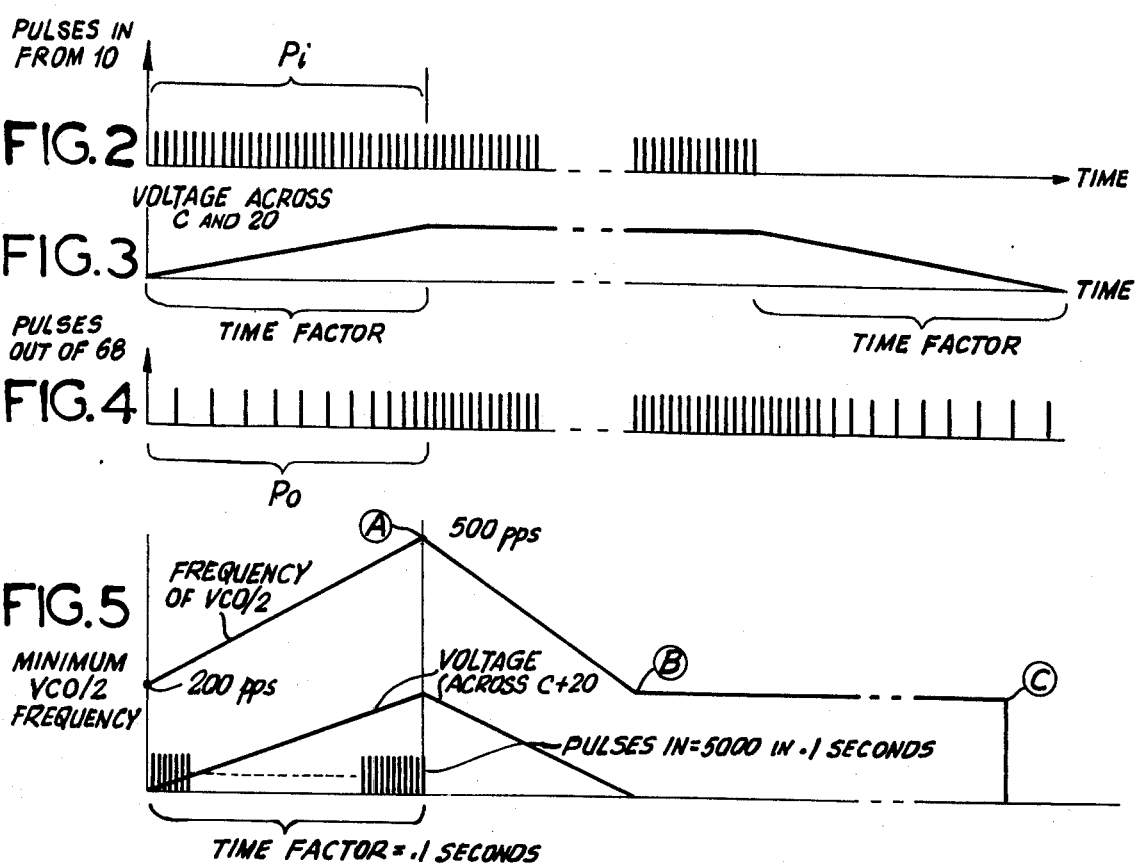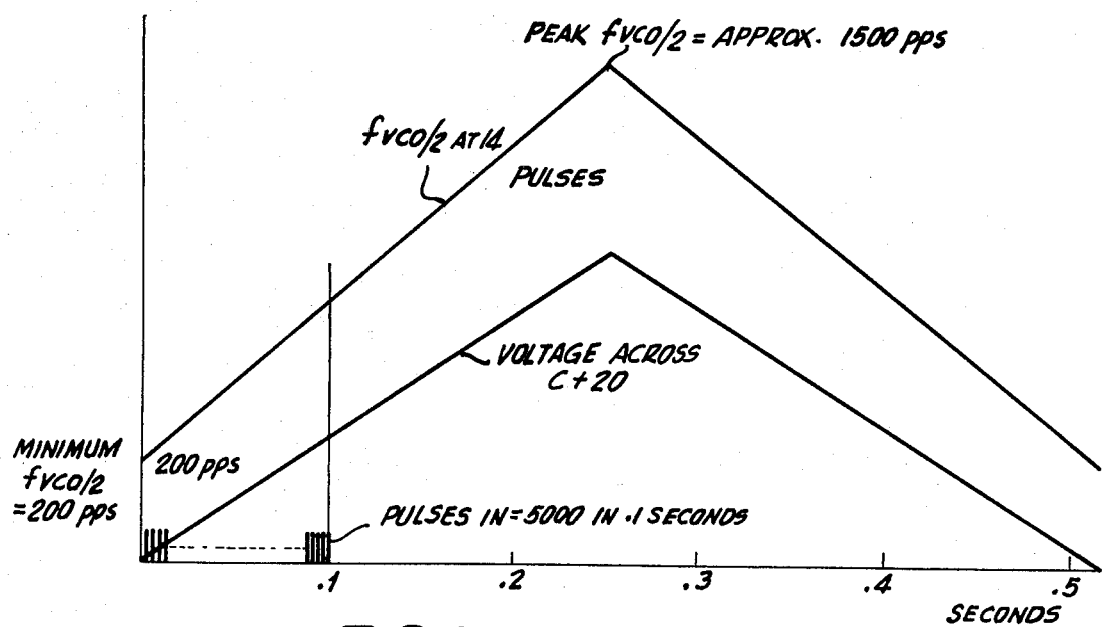

PHASE LOCKED LOOP CONTROL SYSTEM

REFERENCE TO COPENDING APPLICATIONS

This Application is related to the copending application of the same inventors, Thomas E. Beling and Leopold Bric, Ser. No. 850,201, filed Nov. 10, 1977, and assigned to the same assignee as this application.

BACKGROUND OF THE INVENTION

This invention relates to control systems, and particularly to control systems using phase locked loops to deliver pulses from a source to a load, such as a stepping motor, whose inertial characteristics may be too slow to respond to the rate at which input signals, such as pulses, are applied.

It is customary to drive stepping motors with driving pulses produced by a pulsing circuit. Stepping motors, in common with other motors, exhibit an inertia which is more difficult to overcome while starting than after the motor has begun to move. Hence, the motor may not be able to respond immediately to the pulses which arrive during its standstill condition. In most cases, some of the pulses effect the proper stepping operation and some of them are lost. If the relationship between the number of pusles and the movement of the motor is not critical, the loss of these pulses is unimportant. However, where the motor operation depends critically upon the number of pulses applied, such as when the motor is to set a machine tool at a particular position determined by the number of pulses, the loss of pulses affects the positioning accuracy adversely. In fact, the motor may refuse to start at all.

The aforementioned copending application, discloses a system which avoids the loss of initial pulses while the motor is brought up to speed. According to this application, the input pulses are applied to the motor through a phase locked loop while the input pulses are stored and compared with the stored and compared output pulses at the loop VCO. The loop filter is provided with a delay, corresponding to or slower than the inertial characteristics of the motor at standstill, and hence allows the VCO frequency to rise or fall only at a rate slower than that determined by the motor inertial characteristics at standstill. The input and output pulses of the loop continue to be stored and compared until the loop locks and thereafter. When the input pulses stop, the loop filter, by virtue of its delay, causes the VCO to continue producing the output pulses until the comparator notes that the number of output pulses equals the number of input pulses, and gates the output pulses off.

This system provides the desired accuracy even if the input pulses arrive at such a fast rate and in such a short burst that they end well before the loop ever locks and the motor ever reaches its operating speed. However, despite the accuracy, this system suffers from a disadvantage. If the burst of input signals is very short in comparison to the filter delay, the VCO frequency rises only for a short time and then produces output pulses at its mimimum rate until the number of output pulses equals the number of pulses in the input burst. The motor then only operates at a very slow speed.

An object of this invention is to overcome these difficulties.

Another object of the invention is to improve control systems of this type.

SUMMARY OF THE INVENTION

According to a feature of this invention, these objects are attained, in whole or in part, by causing the filter to raise the VCO frequency at the given rate until the number of pulses appearing at the loop output is equal to one-half the number of pulses at the input burst or until the loop locks. According to another feature of the invention, the loop filter then causes the VCO to decrease in frequency at the given rate.

According to another feature of the invention, a comparison system stores, counts, and compares the input and output pulses and a logic system causes the filter to make the VCO frequency rise until the number of output pulses equals the number of input pulses or until the loop locks.

These and other features of the invention are pointed out in the claims. Other objects and advantages of the invention will become evident from the following detailed description when read in light of the accompanying drawings.

BRIEF DESCRIPTION OF THE DRAWINGS

FIG. 2 is a graph illustrating the operation of the system if it did not include the features of the invention.

FIG. 3-8 are graphs illustrating the operation of the embodiment in FIG. 1.

DETAILED DESCRIPTION OF THE PREFERRED EMBODIMENT

Figure 1:
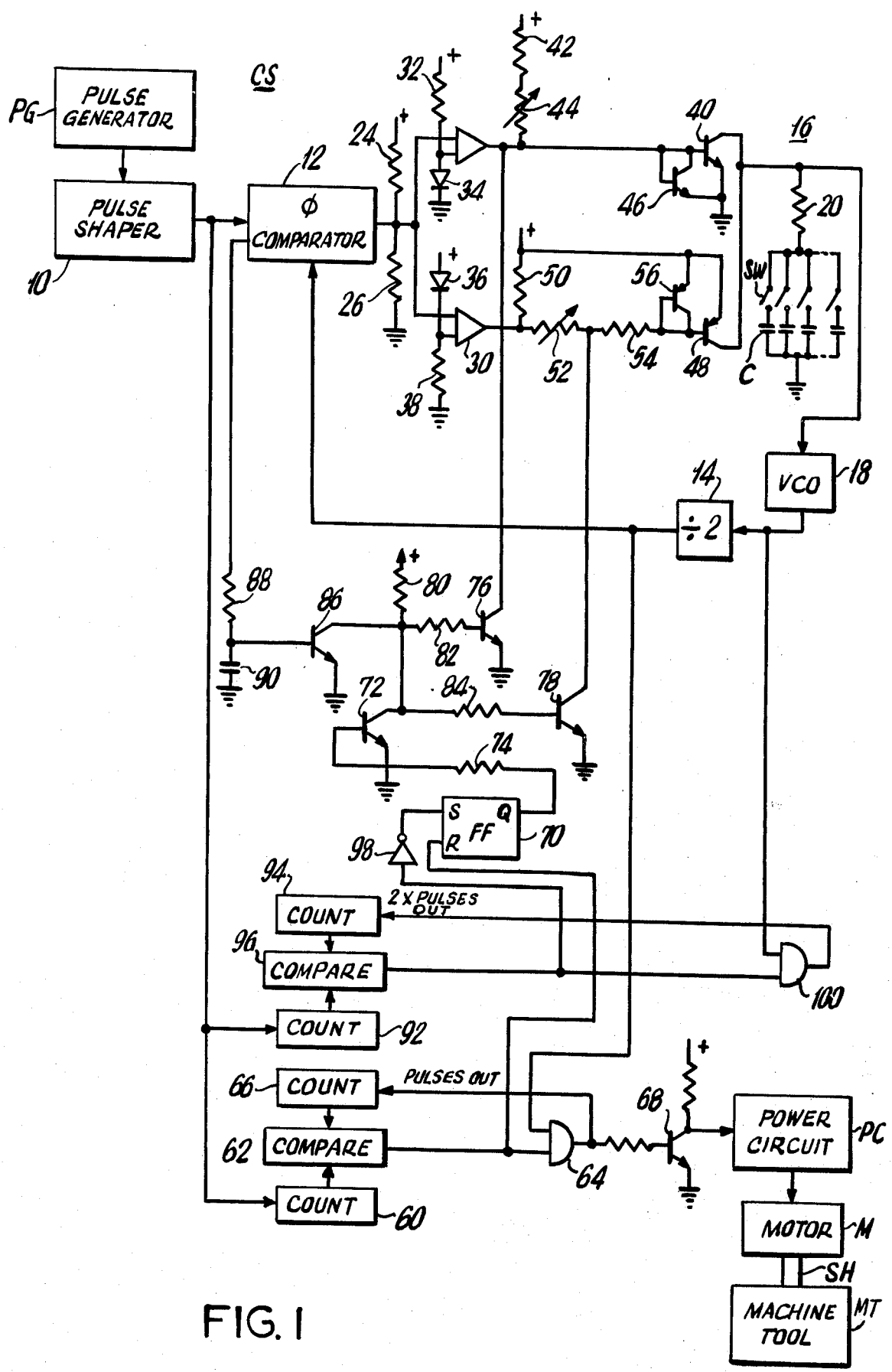
FIG. 1 is a partially schematic and partially block diagram illustrating a circuit embodying features of the invention.

In FIG. 1, a control system CS applies the signals appearing at the output of a pulse generator PG to a power amplifying power circuit PC that drives a motor M whose output shaft SH controls a machine tool MT. In the control system CS, a pulse shaper 10 shapes the pulses from the pulse generator PG and applies them to one input of a phase comparator 12. The phase comparator 12 compares the phase of signals from a digital divider 14 to produce a voltage corresponding to or proportional to the phase between the two input signals thereto. A filter, generally designated 16, filters the output of the phase comparator 12 and applies it to a voltage control oscillator (VCO) 18 whose frequency output is proportional or corresponds to the voltage applied thereto. The digital divider 14 then divides the output of the voltage controlled oscillator by 2 for application back to the phase comparator 12. The members 12, 14, 16, and 18 operate like a phase locked loop. That is, the signals from the digital divider 14 are compared by the phase comparator with the signals from the pulse shaper 10. The greater the phase difference, the greater the voltage output form the comparator 12, and hence the output voltage of the filter 16. This increases the frequency of the voltage controlled oscillator 18, so that the output of the divider 14 produces less of a phase difference between itself and the output of the pulse shaper. This keeps the output of the voltage controlled oscillator 18, and hence the digital divider 14, in synchronism or step with the input of the pulse shaper 10. When such synchronism or in-step operation occurs, the loop is said to be locked.

Phase locked loops are described in the book "Phase-Locked Loops" by Alain Blanchard, published by John Wiley & Sons, Inc., of New York, etc. 1976. In the filters of such loops, the voltage from the phase comparator is normally applied across two resistors and a capacitor in series. The output is taken across the series circuit composed of one of the resistors and the capacitor.

In the filter 16, the voltage is taken from across a 1K resistor 20 and a composite capacitor 22 formed from one or more of the capacitors C connected in parallel by preset switches SW.

In the filter 16, a pair of resistors 24 and 26 forms a voltage divider which biases the output of a phase comparator 12 to a central voltage. If the two input frequencies to the phase comparator 12 are substantially equal, it will produce a voltage output within a predetermined central range about the central voltage established by the resistors 24 and 26. If the "signal" input frequency from the pulse shaper 10 is higher than the "comparator" or "feedback" input frequency from the divider 14, the phase comparator produces a voltage in a range higher than the predetermined central range. If the signal input frequency from the pulse shaper 10 is lower than the comparator input frequency from the divider 14, the phase comparator produces a voltage in a range below the predetermined central range.

The voltage at the output of the phase comparator 12 and entering the filter 16 at the voltage divider 24, 26, is applied to the negative inputs of two voltage comparators 28 and 30. A resistor 32 and a diode 34 bias the positive input of the comparator 28 to a low value. A diode 36 and a resistor 38 bias the positive input of the comparator 30 to a high value. If the voltage at the output of the voltage divider 24,26 remains in the central range, the comparator 28 is turned off, i.e. produces a low output and the comparator 30 is turned on, i.e. produces a high output. The low output at the comparator 28 turns off an NPN transistor 40 whose base is biased by a 10K resistor 42 in series with a 1M variable resistor 44. A diode connected NPN transistor 46 serves for temperature compensation.

The high output of the comparator 30 turns off a PNP transistor 48 whose base is biased by a 10K resistor 50 as well as a 1M variable resistor 52 and another 10K resistor 54. A diode connected PNP transistor 56 serves for temperature compensation. The OFF transistors 40 and 48 cause no change in the charge of the capacitor C. Hence, when the phase comparator 12 receives substantially equal input frequencies and produces an output in the predetermined voltage range, the transistors 40 and 48 create no change in the voltage of capacitor C. This causes the VCO 18 to maintain its frequency and maintain the locked condition of the phase locked loop.

If the frequency from the pulse shaper 10 is higher than that of the divider 14, and the voltage between resistors 24 and 26 is higher than the predetermined central range, the output of comparator 30 goes low, thereby turning on the transistor 48. A constant current, determined by the resistors 50, 52 and 54, then flows from the positive terminal through the emitter, base, and collector of PNP transistor 48 to charge the capacitor C linearly. The rising voltage in the capacitor C raises the frequency of the VCO 18 and the divider 14 until the frequencies at the phase comparator 12 become substantially equal. The phase locked loop then locks again.

If the input from the divider 14 is higher than the pulse shaper 10, the phase comparator 12 produces a low voltage at the voltage divider 24, 26. This raises the output voltage of the comparator 28, and turns on the transistor 40. The already low voltage at the input to the comparator 30 and high voltage at its output keeps the transistor 48 off. The ON NPN transistor 40 is a constant current conductor and linearly discharges the capacitor C to ground, at a linear rate determined by the resistors 42 and 44. The decreasing voltage across capacitor C lowers the frequency of the VCO 18 and the divider 14. This changes the relationship of the input frequencies at the comparator 12 to make them equal.

The linear rates at which the voltage across the capacitor C and the resistor 20 are allowed to rise and fall as determined by the resistors 42 and 44, and 50, 52, and 54, are selected to be equal to or greater than the inertial characteristics of the motor M and its load MT. More specifically, the components are selected to have a "time factor" such as 0.1 seconds which corresponds to the time it takes for the motor M to reach its operating speed from standstill as a result of its loaded inertia. The loaded inertia includes the internal inertia of the motor as well as the machine tool MT. The time factor is the time it takes the filter output to reach 95% of its maximum value in response to a step function.

Because of the filter 16, the frequency of the VCO 18 and the divider 14 does not keep step with the pulse shaper 10 frequency at the start of any group of pulses from the pulse shaper 10. Rather, when the shaper frequency is something like 600 Hz., the first 60 pulses or so to the phase comparator 12 do not cause an immediate rise in the frequency of the oscillator 18 and hence the digital divider 14. The frequency rises slowly so that the inertia of the loaded motor M can respond to more widely spaced pulses until it has a chance to overcome its own and its load's inertia. This avoids the effect of rapidly rising pulse rate that might fail to produce steps and hence be lost.

Once the motor M has overcome its starting inertia after the first 60 pulses or so, the phase comparator 12 reduces the phase difference between its two inputs and allows the motor M to move the machine tool MT at the appropriate speed. On the other hand, because the initial pulses have been applied to the motor M at a sufficiently slow rate, the motor responds to each of the pulses although at a slower rate at the outset.

To assure that the pulses which arrive at the phase comparator 12 at high speed, but are fed out by the digital divider 14 at low speed reach the motor, a counter 60 stores and counts the input pulses from the pulse shaper 10. A comparator 62 turns on and holds on an AND gate 64. The AND gate 64 then passes the output of the divider 14 to a counter 66 which counts the output pulses from the divider 14. The capacities of the counters 60 and 66 are equal to each other and greater than the number of input pulses expected difference between input pulses and output pulses during the time factor of the filter 16.

A transistor 68 passes the output of the AND gate 64, hence the output of the phase locked loop, to the power circuit PC. The latter moves the motor M, which turns the shaft SH and moves the machine tool MT.

Initially, the counter 66 starts counting and produces a non-0 output at the comparator 62. This turns on the gate 64. The phase locked loop composed of members 10, 12, 16, 18, and 14 attempts to produce output pulses at the frequency of the input pulses. However, if the input pulses are arriving at a rate faster than the rate established by the filter 16, in correspondance with the inertial response of the motor M and the machine tool MT, the filter 16 prevents the loop from locking at the input frequency during the initial rise time. The loop produces pulses at a lower rate. The counter 66 now counts the output pulses but lags the counter 60. Thus, the gate 64 remains open.

At the end of the initial rise time, the counter 66 has counted less pulses than the counter 60. Since the numbers of these pulses is unequal, the gate 64 continues to remain open. Once the loop output has locked into the loop input frequency, the inequality still remains. The counters 60 and 66 may continuously recycle, but because of the continued inequality, the outputs of the counters 66 and 60 remain unequal and cause the comparator to keep the gate 64 open.

At the end of the total cycle of the input pulses, the counter 60 stops counting and enters a final count into the comparator 62. However, because of the delay of the filter 16, the capacitor C causes the loop to continue to produce output pulses at the VCO 18 and the digital divider 14. Hence, the counter 66 keeps counting. The transistor 40 of the filter 16 allows the output of the filter, across members C and 20, to decline only at a predetermined rate. Thus, output pulses continue until the count in the counter 66 equals the count of the counter 60. This occurs after the last input pulse when the number of input and output pulses becomes equal. In this regard, it has been assumed that when the loop is locked to the input frequency, i.e. between the initial rise time and the drop at the end, the number of pulses at the input and output are equal.

FIGS. 2, 3 and 4 illustrate the input pulses, the output of the filter 16, and the output pulses respectively. The initial input pulses before the unlocked state, are identified as Pi. The output pulses during this period are identified as Po.

Effectively, the filter 16 produces ramps at the beginning and end of the pulse burst and hence forms a ramper circuit. This ramper circuit assures that for any given number of input pulses, the number of output pulses are exactly equal. It assures a rigid relationship in the angular travel between the motor M and the pulse generator PG. Hence, this portion of the circuit controls not only the angular speed but the angular distances.

The portion of the circuit thus far described starts when the pulse generator PG applies pulses to the pulse shaper 10. The phase comparator compares these pulses with those from the digital divider 14, and applies them to the ramping filter 16. The latter allows its output to change only linearly at a specified rate. Hence, the voltage controlled oscillator changes its frequency in response to the input pulses at a rate slower than the arrival of the input pulses, if the input pulses are arriving faster than the predetermined rate established by the filter 16. The digital divider 14 applies the signals back to the phase comparator. If the rate at which the signals arrive from the digital divider 14 is not as great as that of the input pulses, the output of the phase comparator causes the filter 16 to try to raise the output voltage of the filter until the VCO frequency reaches the frequency of the input pulses as determined by the phase comparator. When the latter occurs, the system is locked. When the last of the input pulses has entered the phase comparator, the voltage output of the filter 16 drops only slowly. Therefore, the voltage controlled oscillator continues to produce pulses at a slowly decreasing rate. The output pulses are passed to the power circuit PC through the gate 64.

In the meantime the counter 60 counts all the input pulses and the comparator 62 compares them to all the output pulses. As long as the number of input pulses is greater than the number of output pulses, the comparator 62 will continue to produce an output. When the input pulses, and hence the counter 60 stop, the VCO 18 continues to produce pulses. Thus, the counter 66 begins to catch up with the counter 60. This continues until the outputs of the counters 66 and 60 are equal. The comparator then turns off the gate 64.

One of the proplems of such a circuit is that a burst of fast pulses may occur and last only for a time less than that needed for the loop to lock. Thus, top speed will not be attained. This in itself is not necessarily bad; the output pulses will still be equal to the input pulses. The motor M will be accelerated and decelerated at the correct rates. However, such short burst operation does not lead to optimum operating times.

If the ramp time, i.e. the minimum time for the filter 16 to allow the VCO 18 and the digital divider 14 to reach the frequency of the phase comparator 12, is 1.0 second, and a burst of 500 pulses at 5,000 steps per second is applied, the pulse burst ends before the ramp time may have a chance to reach its maximum. If the minimum frequency of the VCO 18 is 200 steps per second, during the 0.1 second burst the output rate will increase to 500 steps per second. However, in this time period in which the VCO frequency linearly rises from 200 pulses per second to 500 pulses per second, only $[200+(500-200)/2]0.1=35$ pulses will be delivered to the output. Therefore, the counter 60 has 465 pulses remaining in storage. These must be read out. However, because the input pulses to the phase comparator 12 have stopped, the output speed will start decreasing from 500 steps per second after the burst is terminated. Therefore, most of the output pulses will be read at the minimum frequency of the VCO. If that minimum frequency is 200 steps per second, 430 pulses will be read out at the minimum frequency and the time required would be 2.25 seconds. Therefore, the total time consumed in this move would be 2.35 seconds. See FIG. 5.

The circuit of FIG. 1 accelerates the VCO frequency until one-half of the input pulses are read out of the gate 64 and decelerates for the remainder of the time. This results in a calculated time for a move of 0.52 seconds. The peak speed is about 1,500 steps per second. See FIG. 6.

In order to accelerate the output of the VCO 18 and the divider 14, the comparator 62 resets a flip-flop 70 in response to the pulses entering the counter 60. This lowers the Q output of the flip-flop 70. A transistor 72, which receives the Q output through a resistor 74, responds by turning off, and hence turns on two transistors 76 and 78 biased by resistors 80, 82, and 84. The conducting transistor 76 grounds the base of transistor 40 and turns it off. The conducting transistor 78 grounds the base of PNP transistor 48 and keeps it on. This causes the transistor 48 to keep charging the capacitor C, linearly, through the resistor 20. As a result, the frequencies of VCO 18 and divider 14 keep rising whether or not the pulse shaper 10 has finished transmitting pulses from the pulse generator PG to the phase comparator 12. That is, initially, when the filter 16 prevent the VCO 18 and the divider 14 from keeping in step with the initial pulse burst, the linear rise on the capacitor raises the VCO frequency at a rate suitable for the motor M and machine tool MT. If the pulse burst to the phase comparator from the pulse generator PG ends before the frequency divider 14 has a chance to reach the frequency of the input pulses from the pulse shaper 10, the conducting transistors 76 and 78 maintain the rise in VCO frequency. That is, by turning off the transistor 40 and turning on the transistor 48, the system causes constant current flow from the positive source through the PNP transistor to charge the capacitor C and raise the output frequency of the VCO 18.

If the VCO 18 and divider 14 generate frequencies sufficient to lock the phase locked loop while signal input pulses are still arriving from the pulse shaper 10, the rise in VCO frequency must be stopped. For this purpose, a transistor 86 senses the locked condition of the loop by means of a filter composed of resistor 88 and capacitor 90 at a "phase pulses" output of the phase comparator 12. This output is explained below. In the locked condition, it produces a high input which turns on the transistor 86 which in turn turns off the transistors 76 and 78. The transistor 86 and its associated circuitry 88 and 90 in effect constitute a lock sensor that disables the effect of the reset of flip-flop 70 and the conduction of transistors 76 and 78. It disables the acceleration of the VCO frequency.

A second comparison arrangement composed of a counter 92, a counter 94 and a comparator 96, as well as an inverter 98, disables the accelerating operation of the transistors 76 and 78 when the total number of output pulses has reached one-half the total number of input pulses originally stored. This condition occurs when the output frequency of divider 14 fails to reach the frequency of the signal input pulses from the pulse shaper 10 while the latter applies pulses to the comparator 12.

Figure 7:
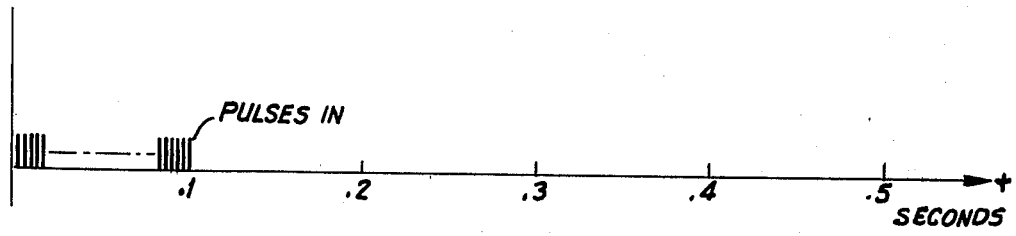
Figure 8:
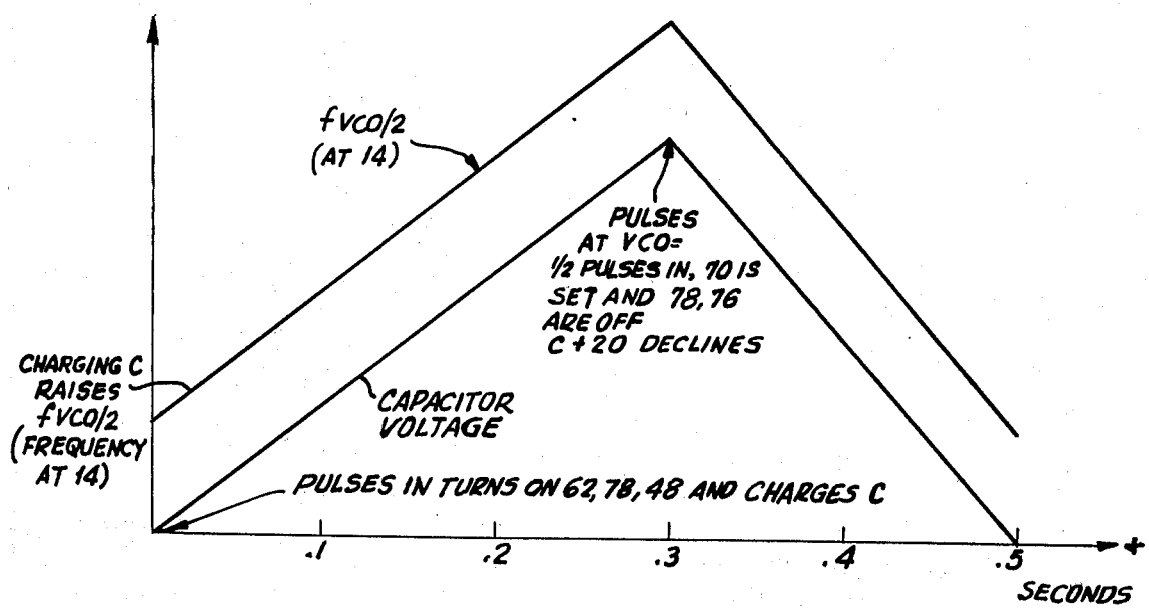

In the second comparison arrangement, the counter 92 starts counting the pulses from the pulse shaper 10. This causes the comparator 96 to turn on an AND gate 100 that delivers the output of the VCO 18 to the counter 94. The counter 92 may receive all of its pulses very quickly. In fact, it is normally expected that this portion of the circuit would operate in response to a rapid pulse burst that ends before the frequency of the divider 14 can reach the frequency of the input pulses from the pulse generator PG. However, the output of the VCO rapidly causes the counter 94 to reach the count of the counter 92 because the VCO 18 generates pulses at twice the feedback frequency. That is, the VCO 18 causes the counter 94 to reach the value of the count 92 when the divider 14 has produced only one-half of the total output pulses. When this occurs, the comparator 96 sets the flip-flop 70 through the inverter 98. This turns off the transistors 76 and 78, thereby disabling their accelerating operation. The loop then continues to function in response to pulses from the VCO 18 and the divider 14 as generated in response to the charge on the capacitor C. At this time there would ordinarily be no pulses appearing from the pulse shaper 10. Hence, the low voltage at the voltage divider 24, 26 turns on the transistor 40 and allows discharge at constant current of the capacitor C. This linearly decreases the voltage across the capacitor C and the series resistor 20, and hence at the input of the voltage controlled oscillator 18. As a result, the frequency of the output pulses decreases. FIGS. 7 and 8 illustrate the pulse and frequencies occurring during various operating modes of the circuit in FIG. 1.

According to the invention, the phase locked loop must respond only to the fundamental frequency. For this purpose, the loop utilizes a phase detector or phase comparator 12 described as phase comparator II in the RCA Manual of Data Devices, published by the Radio Corporation of America, in 1975, the portion entitled "CD4046A Types COS/MOS Micropower Phase-Locked Loop," pages, 465-468. A characteristic of such phase comparators is that no phase difference exists between signal and comparator input over the full VCO frequency range. Such a phase detector is also described in the aforementioned book "Phase Locked Loops" by Alain Blanchard, published by John Wylie and Sons of New York, etc., 1976, Chapter 2, page 28, section 2.1.6. Loops with such phase detectors lock only on the fundamental frequency and not on any harmonics thereof.

Other types of phase detectors may be used together with filters that exclude harmonics. An example of a phase comparator for use in such a loop is the comparator described in the aforementioned RCA publication as phase comparator I with harmonic excluding features.

The phase comparator II in the aforementioned pages of the RCA book, includes an output at a terminal 1 identified as "phase pulses." When the loop is locked, the signal at the "phase pulses" output is at a high level which can be used for indicating a locked condition. It is this output to which the resistor 88 and capacitor 90 are connected in the comparator 12.

While embodiments of the invention have been described in detail it will be evident that the invention may be embodied otherwise without departing from its spirit and scope.

What is claimed is:

1. A system for controlling a motor system having inertia in response to pulses, comprising:
    a phase comparator,
    a filter,
    a voltage controlled oscillator,
    said filter having a time factor equal to or greater than the inertial delay of the motor,
    pulse comparison means for storing two sets of pulses and comparing the numbers of the pulses with each other, said phase comparator having a feedback input and a signal input for receiving input pulses, and
    circuit means for connecting said phase comparator, said filter, and said voltage controlled oscillator into a phase locked loop with a connection to the feedback input to the comparator and for connecting the pulse comparison means to the inputs of the phase comparator so as to store and count the pulses at each of the inputs to the phase comparator and to pass pulses from the feedback input only as long as the counts are unequal.

2. A system as in claim 1, wherein said filter includes a capacitor, and first charging means for charging the capacitor substantially linearly when the frequency at one input is greater than the other and second charging means for discharging the capacitor substantially linearly when the frequency at one of the inputs is lower than the frequency at the other of the inputs.

3. A system as in claim 1, wherein said pulse comparison means includes a gate connected to the feedback input of the phase comparator, and a count compare circuit connected to the gate for turning said gate off when the counts of the pulses are equal.

4. A system as in claims 1, 2 or 3, further comprising:
    accelerating circuit means coupled to said pulse comparison means and said filter for causing said filter to increase the frequency of said voltage controlled oscillator while the pulses compared by said pulse comparison means are unequal.

5. A system as in claim 4, wherein said accelerating means is connected to said charging means and said discharging means for enabling said charging means and disabling said discharging means.

6. A system as in claim 4, further comprising lock sensor means coupled to said phase comparator means for sensing when said phase locked loop is in a locked condition and for disabling said accelerating means when said phase locked loop is locked.

7. A system as in claim 6, wherein said voltage controlled oscillator includes means for producing a first oscillator frequency and a second oscillator frequency twice the first oscillator frequency, one of said oscillator frequencies being substantially equal to the loop frequency of the phase locked loop, the other frequency being different from the frequency of the phase locked loop, and further comprising second pulse comparison means responsive to the pulses at the signal input of the phase comparator and the other oscillator frequency for disabling said accelerator means when said second pulse comparison means has determined that the number of pulses at the feedback input to said phase comparator is equal to one-half the pulses at the signal input to the phase comparator.

* * * * *